United States Patent
Goetting et al.

(10) Patent No.: US 10,236,676 B2
(45) Date of Patent: Mar. 19, 2019

(54) POWER CONVERTER AND METHOD FOR OPERATING A POWER CONVERTER TO MINIMIZE A NUMBER OF TRIGGERING PROCESSES OF A SEMICONDUCTOR SWITCH

(71) Applicant: Robert Bosch GmbH, Stuttgart (DE)

(72) Inventors: Gunther Goetting, Stuttgart (DE); Kay Hindorf, Ludwigsburg (DE); Mark Damson, Stuttgart (DE); Thomas Wiecha, Asperg (DE); Daniel Raichle, Vaihingen (DE); Jochen Kuehner, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/526,181

(22) PCT Filed: Sep. 18, 2015

(86) PCT No.: PCT/EP2015/071453
§ 371 (c)(1),
(2) Date: May 11, 2017

(87) PCT Pub. No.: WO2016/074835
PCT Pub. Date: May 19, 2016

(65) Prior Publication Data
US 2017/0310244 A1    Oct. 26, 2017

(30) Foreign Application Priority Data
Nov. 14, 2014  (DE) .................... 10 2014 223 236

(51) Int. Cl.
*H02H 3/08* (2006.01)
*H02M 7/5387* (2007.01)
*H02M 1/00* (2006.01)

(52) U.S. Cl.
CPC ........ *H02H 3/083* (2013.01); *H02M 7/53875* (2013.01); *H02M 2001/0009* (2013.01)

(58) Field of Classification Search
CPC .......... H02H 3/05–3/105; H02M 7/42–7/5388
See application file for complete search history.

(56) References Cited

U.S. PATENT DOCUMENTS 7,598,698 B2 * 10/2009 Hashimoto ............. H02P 21/18
                                                                    318/798
7,622,873 B2 * 11/2009 Takata .................... H02P 6/182
                                                                    318/362

(Continued)

FOREIGN PATENT DOCUMENTS

CN        101252336        8/2008
CN        102104318 A      6/2011

(Continued)

OTHER PUBLICATIONS

International Search Report for Application No. PCT/EP2015/071453 dated Jan. 7, 2016 (English Translation, 3 pages).

*Primary Examiner* — Kyle J Moody
*Assistant Examiner* — Peter M Novak
(74) *Attorney, Agent, or Firm* — Michael Best & Friedrich LLP

(57) ABSTRACT

The invention is a pulse-controlled inverter with one or more semiconductor switches and freewheeling diodes arranged in parallel to each semiconductor switch. The semiconductor switches are triggered only when the current does not flow through a freewheeling diode that is arranged in parallel to the semiconductor switch. This allows the number of triggering processes for the semiconductor switch to be reduced. The reduced number of triggering processes for the semiconductor switches results in lower power losses and an increased service life of the entire system.

12 Claims, 6 Drawing Sheets

(56) References Cited

U.S. PATENT DOCUMENTS

| | | | |
|---|---|---|---|
| 2008/0198631 A1* | 8/2008 | Zeng | H02M 3/3376 |
| | | | 363/17 |
| 2009/0057832 A1 | 3/2009 | Kouno | |
| 2012/0153921 A1* | 6/2012 | Brokaw | H02M 3/156 |
| | | | 323/288 |
| 2012/0187879 A1 | 7/2012 | Galea et al. | |
| 2012/0306417 A1 | 12/2012 | Schwarz et al. | |
| 2015/0364985 A1* | 12/2015 | Lee | H02M 5/458 |
| | | | 363/37 |
| 2016/0049896 A1* | 2/2016 | Arisawa | H02M 1/32 |
| | | | 318/504 |

FOREIGN PATENT DOCUMENTS

| | | |
|---|---|---|
| CN | 102857135 A | 1/2013 |
| DE | 102009047616 | 6/2011 |
| EP | 2568560 | 3/2013 |
| JP | 01303070 | 12/1989 |
| JP | 2001037242 | 2/2001 |
| JP | 2004088001 A | 3/2004 |
| JP | 2004112878 A | 4/2004 |
| JP | 2010183765 A | 8/2010 |
| JP | 2010259241 A | 11/2010 |
| JP | 2011037242 A | 2/2011 |
| JP | 2011130599 A | 6/2011 |
| JP | 2012143075 | 7/2012 |
| JP | 2014138538 A | 7/2014 |
| JP | 2014212602 A | 11/2014 |

* cited by examiner

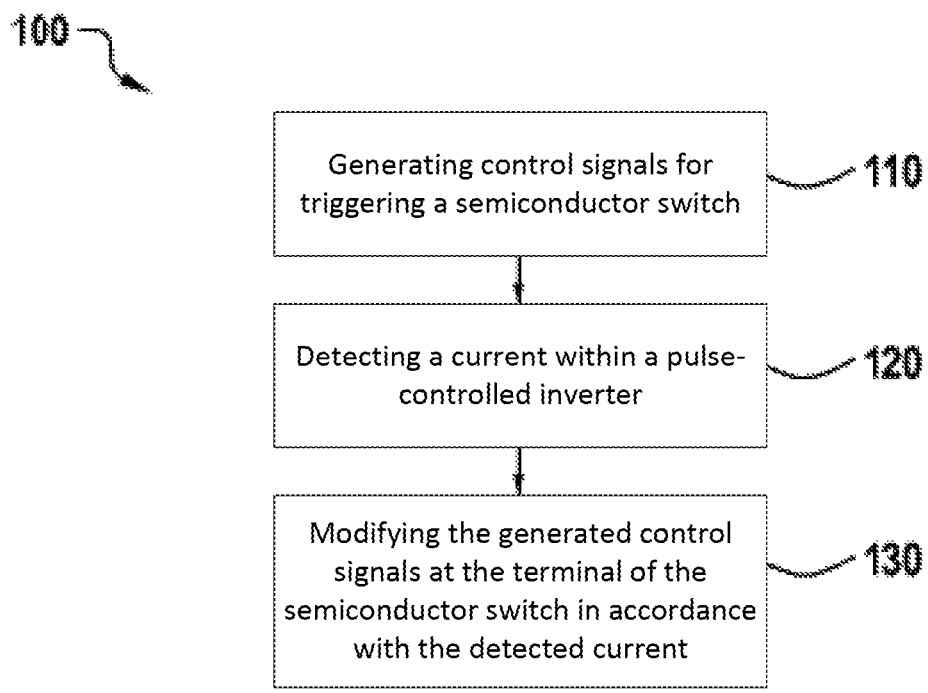

POWER CONVERTER AND METHOD FOR OPERATING A POWER CONVERTER TO MINIMIZE A NUMBER OF TRIGGERING PROCESSES OF A SEMICONDUCTOR SWITCH

BACKGROUND OF THE INVENTION

The present invention relates to a power converter and a method for operating a power converter.

The German patent application DE 10 2009 047 616 A1 discloses an inverter arrangement for operating an electric motor. The electric motor is controlled via a B6 bridge in this case.

Power converters are frequently utilized in electric drives. These power converters convert a DC voltage, for example from a battery, into an AC voltage which is suitable for controlling an electric machine. Such power converters generally include a half-bridge for each phase of the electric machine. In this case, such a half-bridge consists of two switch elements, preferably semiconductor switches, each of which is additionally provided with a freewheeling diode arranged in parallel thereto. Bipolar transistors having an insulated gate electrode (IGBT) are generally utilized as semiconductor switches for applications having high voltages which occur in electric and hybrid vehicles, for example. Such IGBTs can conduct a currently only in the forward conducting direction in this case.

Such IGBTs are generally triggered by so-called gate drivers and boosters. The energy required by these assemblies depends on the number of switching processes per unit of time in this case.

Therefore, there is a need for a power converter having a method for triggering a power converter which requires less power.

SUMMARY OF THE INVENTION

For this purpose, the present invention provides, according to one first aspect, a pulse-controlled inverter for providing a pulse-width modulated output voltage at a phase terminal, comprising a semiconductor switch which includes an input terminal, an output terminal, and a control terminal; and comprising a diode which is arranged in parallel to the semiconductor switch, between the input terminal and the output terminal of the semiconductor switch, wherein the pulse-width modulated output voltage is provided at a node, at which the diode and the input terminal or output terminal of the semiconductor switch are connected to each other. The pulse-controlled inverter further includes a current detector which is designed for detecting a current in the pulse-controlled inverter; and a control device which is designed for generating control signals for triggering the semiconductor switch and providing said signals at the control terminal of the semiconductor switch, wherein the control device is further designed for suppressing a generated control signal for triggering the semiconductor switch in accordance with the current at the control terminal of the semiconductor switch, which is detected by the current detector.

According to one further aspect, the present invention provides a method for operating a pulse-controlled inverter comprising a semiconductor switch which includes an input terminal, an output terminal, and a control terminal, and comprising a diode which is arranged in parallel to the semiconductor switch, between the input terminal and the output terminal of the semiconductor switch, wherein the pulse-controlled inverter provides a pulse-width modulated output voltage at a phase terminal. The method includes, in this case, the steps of generating control signals for triggering the semiconductor switch; detecting a current in the pulse-controller inverter; and suppressing the generated control signals at the control terminal of the semiconductor switch in accordance with the detected current of the pulse-controller inverter.

The present invention is based on the idea of triggering a semiconductor switch only when a current in a current path comprising a semiconductor switch and a freewheeling diode arranged in parallel to the semiconductor switch does not flow through the freewheeling diode anyway. If it is established, however, that a current can also flow through a freewheeling diode arranged in parallel to the semiconductor switch, an active triggering of the semiconductor switch does not take place. This allows the number of triggering processes for the semiconductor switch to be minimized.

The process of suppressing triggering signals is considered to mean, in particular, that a conventional generation/calculation of triggering signals initially takes place. The triggering signals obtained in this way also include, in this case, a triggering of semiconductor switches of the pulse-controlled inverter, in which the current flows through freewheeling diodes arranged in parallel to the semiconductor switches. In this case, in order to now "suppress" the triggering signals, such triggering signals, which have already been generated, are not forwarded to the control terminal of the semiconductor switches.

Additionally or alternatively, a suppression of control signals according to the invention can also be considered to be that the current progressions within the pulse-controlled inverter are taken into account already during the generation of the triggering signals. If this analysis of the current progressions reveals that a current flows through a freewheeling diode, the process of generating/calculating the triggering signals can also take this into account already for a suppression of triggering signals for semiconductor switches in this case. The suppression of triggering signals according to the invention therefore includes the process in which triggering signals which should not be forwarded to a semiconductor switch are not generated at all. Reducing the triggering processes for the semiconductor switch also results in a reduction in the power uptake of the components which provide the driver signals to the control terminal of the semiconductor switch. This allows the power required by the power converter to be lowered.

In addition, due to the reduced power uptake of the components for driving the semiconductor switch, the power loss and, therefore, the thermal energy generated during the triggering of the semiconductor switch are also reduced. Therefore, less effort is required for dissipating the generated heat.

In addition, due to the reduction in the triggering processes for the semiconductor switch, and due to the reduced power loss, the service life of the components of the power converter can also be increased.

According to one embodiment of the pulse-controlled inverter, the current detector is designed for detecting a current through the diode, the semiconductor switch, or at the phase terminal.

According to one embodiment, the control device suppresses the generated control signal at the control terminal of the semiconductor switch when a current in a predetermined direction is detected. This allows a particularly simple suppression of triggering pulses at the control terminal of the semiconductor switch to be achieved.

According to one embodiment, the control device of the pulse-controlled inverter suppresses the generated control signal at the control terminal of the semiconductor switch if the absolute value of the current detected by the current detector is greater than a predetermined threshold value. Preferably, the predetermined threshold value can be adjustable. Due to the adjustment of the threshold value, a safe and reliable operation of the power converter can still be achieved even in borderline cases of currents close to the zero crossover.

According to one embodiment, the control device is further designed for calculating a current progression in the pulse-controlled inverter and providing the generated control signals in accordance with the calculated current progression at the control terminal of the semiconductor switch. The calculated current progression can be calculated, in this case, in particular by using previously detected currents. This allows the current to be estimated in advance. Therefore, an efficient suppression of triggering signals at the control terminal of the semiconductor switch can be achieved without the need for additional circuit complexity. According to one embodiment, the semiconductor switch is a bipolar transistor having an insulated gate electrode (IGBT).

According to one embodiment, the pulse-controlled inverter includes a half-bridge which includes a first semiconductor switch, a first diode, a second semiconductor switch, and a second diode. The first semiconductor switch is arranged between the positive potential of a supply voltage and a node, the second semiconductor switch is arranged between the node and the negative potential of the supply voltage, the first diode is arranged between the positive potential of the supply voltage and the node, and the second diode is arranged between the node and the negative potential of the supply voltage. The phase terminal is connected to the node.

According to one embodiment, the step for suppressing the generated control signal at the control terminal of the semiconductor switch suppresses the control signal if a current in a predetermined direction was detected in the step of detecting a current within the pulse-controlled inverter.

According to one further embodiment, the step of suppressing the generated control signal provides the control signal at the control terminal of the semiconductor switch only if the absolute value of the detected current is less than a predetermined threshold value.

According to one embodiment, the method further includes a step of calculating a current progression which occurs at the pulse-controlled inverter, wherein the step of calculating the resultant current progression performs the calculation on the basis of the detected current, and wherein the step of suppressing the generated control signal at the control terminal of the semiconductor switch suppresses the control signal on the basis of the calculated current progression.

According to one further embodiment, the step of calculating the resultant current progression calculates the current progression on the basis of a Clarke transformation.

Further embodiments and advantages of the present invention result from the following description with reference to the attached drawings.

BRIEF DESCRIPTION OF THE DRAWINGS

In the drawings:

FIG. 6 shows a schematic representation of a flow chart which forms the basis for a method for operating a pulse-controlled inverter according to one embodiment.

DETAILED DESCRIPTION

Figure 1:
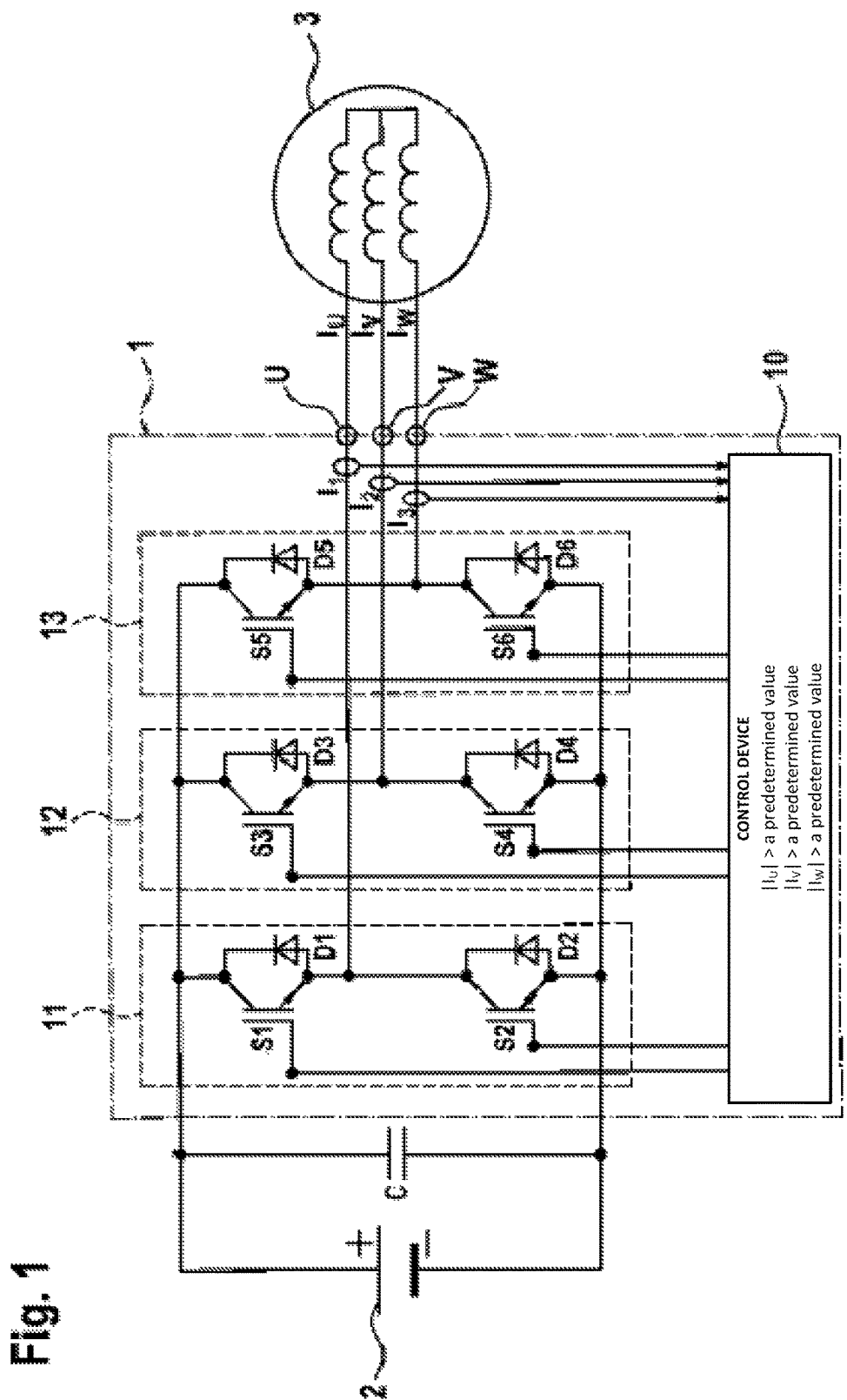
FIG. 1 shows a schematic representation of a pulse-controlled inverter according to one embodiment.

FIG. 1 shows a schematic representation of a pulse-controlled inverter 1. The pulse-controlled inverter 1 is supplied by a battery 2 or another voltage source, in particular a DC voltage source. An intermediate circuit capacitor C can be arranged at the input of the pulse-controlled inverter 1 in order to stabilize the input voltage. The pulse-controlled inverter 1 converts the input DC voltage into an output voltage which is suitable for controlling an electric drive 3. Preferably, the electric drive 3 can be an electric motor having one or multiple phases. The number of three phases, which is represented here, is intended merely to improve understanding and is not intended to limit the invention. Preferably, the electric drive 3 is controlled by an AC voltage generated by the pulse-controlled inverter 1.

The pulse-controlled inverter 1 includes a half-bridge 11, 12, 13 for each phase of the electric drive 3. Each of these half-bridges 11, 12, 13 includes two semiconductor switches S1-S6. The first semiconductor switch S1 of the first half-bridge 11 is electrically connected to a terminal having the positive potential of the input voltage from the battery 2. The other terminal of this semiconductor switch S1 is connected to a node. A terminal of the second semiconductor switch S2 of this half-bridge 11 is also electrically connected to this node. The other terminal of this second semiconductor switch S2 is electrically connected to the negative potential of the voltage of the battery 2. In addition, the node, at which the first semiconductor switch S1 and the second semiconductor switch S2 are connected to each other, is connected to a phase terminal U. This phase terminal U of the pulse-controlled inverter 1 is electrically connected to the corresponding phase terminal of the electric drive 3. A freewheeling diode D1 is arranged between the two terminals of the semiconductor switch S1, in parallel to the first semiconductor switch S1 The forward conducting direction of the freewheeling diode D1 is opposite to the forward conducting direction of the semiconductor switch S1 in this case. Similarly, a second freewheeling diode D2 having an opposite forward conducting direction is also arranged in parallel to the second semiconductor switch S2. In addition, the control terminals of the first semiconductor switch S1 and the second semiconductor switch S2 are connected to a control device 10.

The second half-bridge 12 and the third half-bridge 13 are designed similarly to the above-described first half-bridge 11, wherein the nodes, at which the two semiconductor switches S3 and S4 or S5 and S6 are respectively connected to each other, are connected to the further phase terminals V, W. These phase terminals V and W are also connected to corresponding phase terminals of the electric drive 3. The output voltages provided at the nodes of the half-bridges 11-13 and, therefore, at the phase terminals U, V, W therefore generate the phase currents $I_U$, $I_V$, $I_W$ in the current path between the nodes of the half-bridges 11-13 and the phase terminals U, V, W.

In order to measure the currents $I_U$, $I_V$, $I_W$, a current detector I1-I3 is arranged in the current path between the nodes, at each of which two semiconductor switches S1-S6 are connected to each other, and a phase terminal U, V, W. This allows a first current detector I1 to detect a current between the first half-bridge 11 and the first phase terminal U. Similarly, the further current detectors I2 and I3 can also detect the corresponding currents between the half-bridges 12 and 13 and the phase terminals V, W, respectively. The current detectors I1 and I3 each provide a detector signal, which corresponds to the particular detected current, at the control device 10.

For the case of a multi-phase pulse-controlled inverter 1, the current detector I1, I2 or I3 can be omitted at one of the phase terminals U, V, W. Since the sum of all phase currents $I_U$, $I_V$, $I_W$ always equals zero, one of the phase currents $I_U$, $I_V$, $I_W$ can be calculated if all the other phase currents are known. Given a three-phase pulse-controlled inverter 1, for example, it is therefore possible to detect only two phase currents $I_U$, $I_V$, $I_W$ by means of current detectors I1, I2, I3 and to calculate the third phase current $I_U$, $I_V$, $I_W$ by using the two detected phase currents $I_U$, $I_V$, $I_W$. Alternatively, all the phase currents $I_U$, $I_V$, $I_W$ can also be detected and then a plausibility check can be carried out, in order to ensure that all detected phase currents $I_U$, $I_V$, $I_W$ are correct. If the plausibility check reveals that the sum of the detected phase currents does not equal zero or deviates significantly from zero, a malfunction can be deduced and the suppression of the triggering signals at the semiconductor switches S1-S6 can be omitted, in order to increase the operational reliability. The control device 10 triggers the semiconductor switches S1 to S6 on the basis of a predefined setpoint value and, if necessary, also on the basis of measured values such as, for example, the rotational speed of the electric drive 3. On the basis of the pattern of the triggering of the semiconductor switches S1 to S6 by the control device 10, the pulse-controlled inverter 1 generates a suitable pulse-width modulated phase voltage (pulse-width modulation=PWM) at the phase terminals U, V, W which are connected to the phase terminals of the electric drive 3. For this purpose, the triggering pulses from the control device 10, which are initially present as digital signals, must be amplified and adjusted by means of driver stages, which are not represented here, so that the control signals are suitable for triggering the semiconductor switches S1 to S6 at their control inputs.

Figure 2:
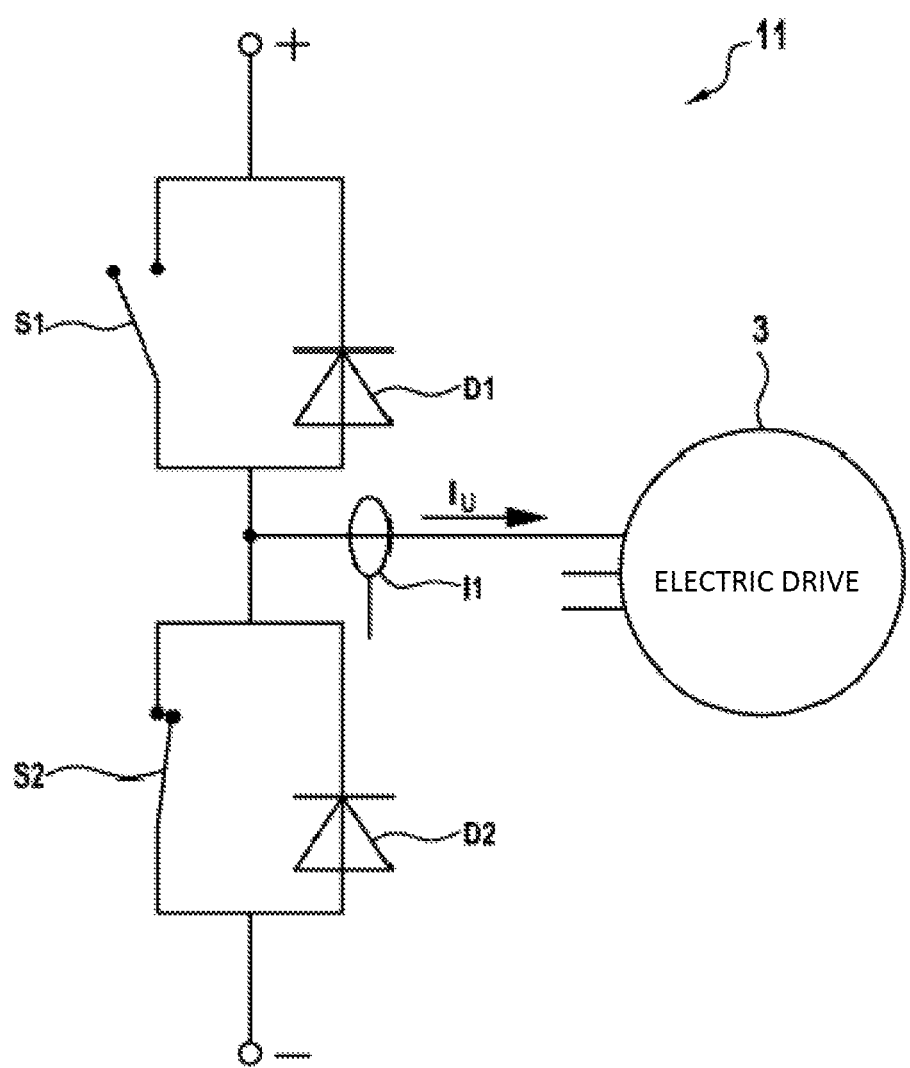
FIG. 2 shows a schematic representation of a half-bridge of a pulse-controlled inverter according to one embodiment.

FIG. 2 shows one schematic representation of a half-bridge 11 according to one embodiment. The half-bridge which is represented in this case can be, for example, the first half-bridge 11 of the pulse-controlled inverter 1 from FIG. 1. The two semiconductor switches S1 and S2 are represented as conventional switches in this case in order to better illustrate the switching states. In this case, the upper switch S1 (high-side switch), which is connected to the positive potential of the supply voltage, is open. The lower semiconductor switch S2 (low-side switch), which is connected to the negative potential of the supply voltage, is closed in this case. If the current $I_U$ in the node between the two semiconductor switches S1 and S2 flows in the direction of the electric drive 3, the current can flow through the lower freewheeling diode D2 in this case. Since the current can flow through the freewheeling diode D2 arranged in parallel to the lower semiconductor switch S2, it is not required, in this case, that the lower semiconductor switch S2 be triggered and, therefore, closed. The preceding comments for the lower semiconductor switch S2 of the first half-bridge 11 also apply similarly for the further half-bridges 12 and 13.

Furthermore, in the case of a current $I_U$ from the electric drive 3 in the direction of the pulse-controlled inverter 1, the current $I_U$ can then also flow across the freewheeling diode D1 of the half-bridge 11 when the upper semiconductor switch S1 of the half-bridge 11 is closed and the lower semiconductor switch S2 is open. Therefore, a triggering of the upper semiconductor switch S1 can be dispensed with in the case of a current flow $I_U$ from the electric drive 3 in the direction of the pulse-controlled inverter 1. If the phase current $I_U$ is known and, in particular, if the sign of this phase current $I_U$, i.e., the direction in which the phase current $I_U$ is flowing, is known, it is therefore possible to determine, without any additional sensors, whether the current flows through the freewheeling diode D1 or D2, or whether an active triggering of the semiconductor switch S1 or S2 arranged in parallel to the particular freewheeling diode D1, D2 is required. As was explained using the preceding remarks, in the case of a phase current $I_U$ from the half-bridge 11 to the electric drive 3, a triggering of the lower semiconductor switch S2 (low-side switch) can be dispensed with. In the case of a phase current $I_U$ from the electric drive 3 in the direction of the half-bridge 11, a triggering of the upper semiconductor switch S1 (high-side switch) can be dispensed with.

In order to avoid a triggering of the particular semiconductor switch S1 to S6 when the current flows anyway through the freewheeling diode D1 to D6 arranged in parallel thereto, the control device 10 evaluates the detector signals generated by the detector devices I1 to I3 and, in particular, the direction of the currents $I_U$, $I_V$, $I_W$ at the phase terminals U, V, W. If this evaluation reveals that a current flows through one of the freewheeling diodes D1 to D6, the triggering of the semiconductor switch S1 to S6 arranged in parallel thereto can be dispensed with, without the need to directly measure the current through one of the diodes D1-D6 for this purpose. This allows for a maximum of up to 50% of the switching processes in the particular semiconductor switches to be saved as compared to a conventional triggering.

Figure 3:
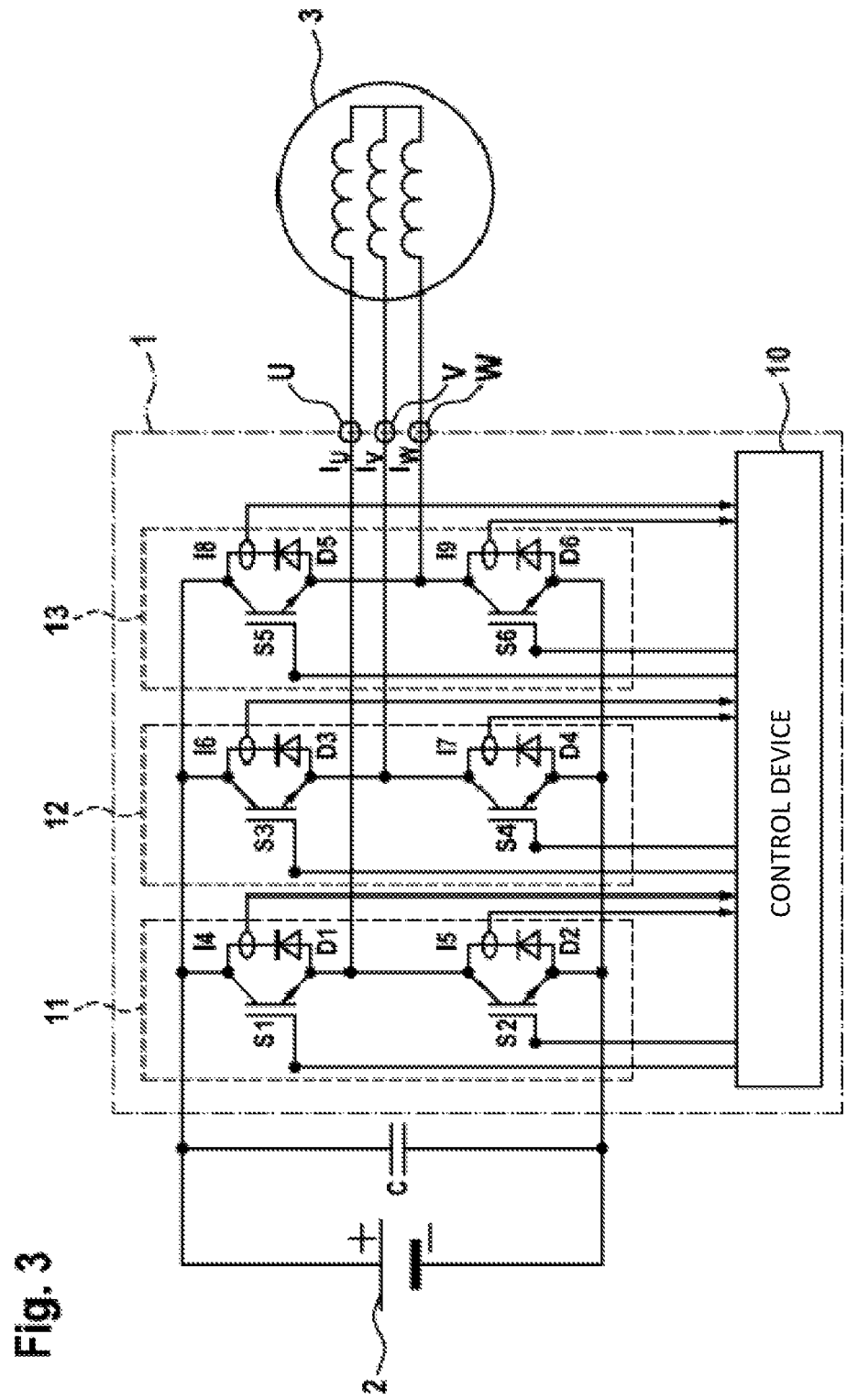
FIG. 3 shows a schematic representation of a pulse-controlled inverter according to one further embodiment.

FIG. 3 shows one further embodiment of a pulse-controlled inverter 1. The design in this case essentially corresponds to the design of the pulse-controlled inverter from FIG. 1. In addition, the pulse-controlled inverter 1 represented here does not include the three current detectors I1, I2 and I3, but rather the six current detectors I4 to I9. In this case, one current detector I4-I9 is arranged in the current path of one of the freewheeling diodes D1-D6 in each case. This allows the currents through the corresponding freewheeling diodes D1-D6 to be directly detected by the current detectors I4-I9, respectively. From the detector signals of these current detectors I4-I9 in the current paths of the freewheeling diodes D1-D6, a current flow through the diodes D1-D6 can therefore be directly deduced. In the case in which a current flows through the particular freewheeling diode D1-D6, a triggering of the semiconductor switch S1-S6 arranged in parallel thereto can therefore be suppressed.

Alternatively, rather than monitoring the current detectors I4-I9 in the current paths of the freewheeling diodes D1-D6, it is also possible to monitor the currents in the current paths of the semiconductor switches S1-S6 (not represented here). In the case of a triggered semiconductor switch S1-S6, if it is established that no current flows in the current path of the corresponding semiconductor switch S1-S6, it can be deduced that the current must flow through the freewheeling diode D1-D6 arranged in parallel thereto.

In order to further increase the operational reliability, the suppression of the triggering of a semiconductor switch S1 to S6 can also take place only if the absolute value of the detected current $I_U$, $I_V$, $I_W$ at the phase terminals U, V, W exceeds a predefined threshold value. The decision whether to suppress the control signals for the upper (high-side) semiconductor switch (S1, S3, S5) or for the lower (low-side) semiconductor switch (S2, S4, S6) when the threshold value of the current $I_U$, $I_V$, $I_W$ is exceeded takes place in this case with consideration for the current direction, i.e., the sign of the detected current $I_U$, $I_V$, $I_W$. If the absolute value of the current $I_U$, $I_V$, $I_W$ at the phase terminals U, V, W is below this predefined threshold value, however, the particular semiconductor switch S1 to S6 is triggered in this case. Correspondingly, a suppression of the triggering can also take place only if the detected currents exceed a predetermined threshold value when a current is detected through the current detectors I4-I9 in the current paths of the freewheeling diodes D1-D6 according to FIG. 3.

This allows the control device 10 to initially generate all the control signals for triggering the particular semiconductor switches S1 to S6, as has also been the case so far with conventional pulse-controlled inverters. If it is detected in this case, however, that the particular semiconductor switch S1 to S6, which is supposed to be triggered at this time, does not necessarily need to be closed, since the current will flow through a freewheeling diode D1 to D6 arranged in parallel to the semiconductor switch S1-S6, the control signal generated by the control device 10 is suppressed and is not applied at the control terminal of the particular semiconducting switch S1 to S6. The particular semiconductor switch S1 to S6 therefore remains open.

The suppression of the triggering signal, which is generated by the control device 10, for the control terminals of the semiconductor switches S1 to S6 can be implemented, in this case, as a hardware solution or as a software solution. In the case of a hardware solution, the control device 10 includes, for example, a logic component which, on the basis of the detected currents $I_U$, $I_V$, $I_W$ at the phase terminals U, V, W and, in particular, on the basis of the current directions, does not output the triggering signal generated within the control device 10 due to a logic operation, or due to a similar circuit configuration. Therefore, a control signal is not present at the particular semiconductor switch S1 to S6 if it is determined from the evaluation of the detected currents $I_U$, $I_V$, $I_W$ at the phase terminals U, V, W that the current flows anyway through the freewheeling diode D1-D6 arranged in parallel to the semiconductor switch S1-S6. For example, this can take place by means of an AND operation of the generated control signal and the detected current, including an inversion of individual signals, if necessary. Other circuit configurations for suppressing control signals which were generated by the control device 10 are also likewise possible. In particular, the current detected by the particular detector devices I1 to I3 can also be compared, in advance, with a predefined threshold value, and the result of this comparison with a threshold value can then be utilized for the further processing. Similarly, the suppression of the triggering signals for the semiconductor switches S1-S6 can also take place on the basis of the detector signals from current detectors I4-I9 in the current paths of the freewheeling diodes according to FIG. 3.

In one alternative embodiment, the control device 10 can also evaluate the phase currents detected by the detector devices I1 to I3 or the diode currents detected by the detector devices I4 to I9 using software and, on the basis of this software-based processing, can output a control signal for the particular control terminals of the semiconductor switches S1 to S6 only when no current flows through the corresponding freewheeling diodes D1 to D6, or only when the current through the particular freewheeling diodes D1 to D6 lies below a predefined threshold value. In this case, during the implementation of the suppression of triggering signals for the particular semiconductor switches S1 to S6, it must be noted that a system-related lag time occurs between the detection of the currents through the detector devices I1 to I9 and the triggering of the semiconductor switches S1 to S6, since the processing of the signals by the detector device I1 to I9 by means of software requires a corresponding amount of computing time. Therefore, after the detection of the currents at the start of a PWM increment $\Delta t_{PWM}$, only the switch-on and switch-off times of the subsequent increment can be calculated by the control device 10. The triggering of a semiconductor switch S1-S6 can be up to one PWM increment $\Delta t_{PWM}$ long as the maximum, wherein the conventional triggering of the upper and the lower semiconductor switches in a half-bridge takes place in a reciprocal manner in each case. In order to ensure that a short circuit is not induced between the positive and the negative potentials of the supply voltage by means of a simultaneous triggering of the two semiconductor switches of a half-bridge when the triggering switches from the upper semiconductor switch to the lower semiconductor switch (or vice versa), a protection time can be additionally provided, in which a semiconductor switch of a half-bridge is not triggered. This temporal correlation is illustrated in FIG. 4, for example.

Figure 4:
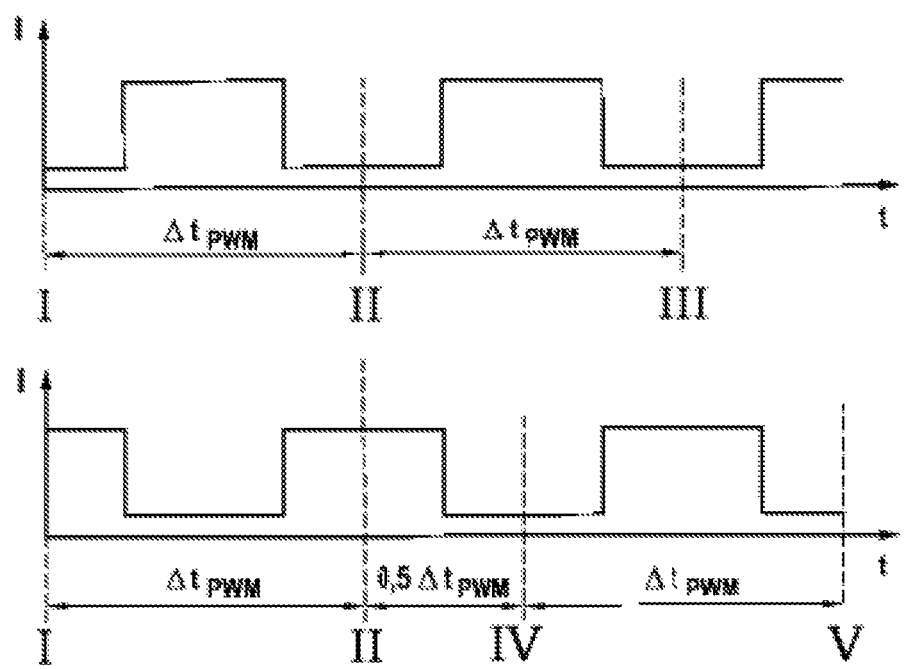
FIG. 4 shows a diagram for illustrating the temporal progressions of the type which form the basis for a pulse-controlled inverter according to one embodiment.

A triggering signal for the upper semiconductor switch, for example, the semiconductor switch S1 of the first half-bridge 11, is represented in the upper diagram in FIG. 4. In this case, a logical high corresponds to a triggering and a logical low corresponds to a deactivated switch. A triggering signal, which is calculated within one PWM increment, first acts in the subsequent PWM increment in this case. The current values forming the basis for the triggering during one PWM increment (e.g., between II and III) originate from the beginning of a preceding PWM increment (e.g., at the point in time I) in this case. A calculation or prediction of currents for the output or suppression of triggering signals for the semiconductor elements takes place on the basis of these preceding current values. The prediction for a lower semiconductor switch, for example, the semiconductor switch S2 of the first half-bridge 11, takes place in this case so as to be offset from the prediction of the upper semiconductor switch by one-half of a PWM increment ($0.5\Delta t_{PWM}$), as is represented between IV and V in the lower diagram in FIG. 4.

If the intention is to dispense with a triggering of a semiconductor switch S1 to S6, the sign of the phase current must not change, in this case, during the entire potential triggering period of the particular semiconductor switch S1 to S6. A particularly reliable prediction of the phase currents is required for this purpose. The phase currents generally assume an at least approximately sinusoidal shape in this case. For a three-phase electric drive, the phase currents $I_U$, $I_V$, $I_W$ of the three phases U, V and W can be represented as current phasors having the coordinates $I_\alpha$ and $I_\beta$ in an α-ß coordinate system, by means of Clarke transformation:

$$\begin{bmatrix} I_\alpha \\ I_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_U \\ I_V \\ I_W \end{bmatrix}$$

In this case, the current phasor rotates with an angular velocity ω. If it is also assumed that the length of the current phasor and the angular velocity are constant for short periods of time, the α-ß coordinates of the predicted current phasor can be determined as $I_{\alpha,pred}$ and $1_{\beta,pred}$:

$$\begin{bmatrix} I_{\alpha,pred} \\ I_{\beta,pred} \end{bmatrix} = \begin{bmatrix} \cos(\omega t) & -\sin(\omega t) \\ \sin(\omega t) & \cos(\omega t) \end{bmatrix} \begin{bmatrix} I_\alpha \\ I_\beta \end{bmatrix}$$

In order to further increase the accuracy of this prediction, a change in the amplitude and the phase angle of the current phasor can be additionally accounted for in a rotor-flux fixed coordinate system (d-q coordinate system). This can take place with the aid of a suitable machine model with consideration for the terminal voltage. An inverse Clarke transform, for example, can be used for a subsequent determination of the sign of the particular phase currents $I_{U,pred}$, $I_{V,pred}$ and $I_{W,pred}$:

$$\begin{bmatrix} I_{U,pred} \\ I_{V,pred} \\ I_{W,pred} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} I_{\alpha,pred} \\ I_{\beta,pred} \end{bmatrix}$$

On the basis of the phase currents $I_{U,pred}$, $I_{V,pred}$ and $I_{W,pred}$, which have been calculated in this way, and on the basis of their signs, a suppression of the triggering of the particular semiconductor switches S1 to S6 can take place if, on the basis of the calculated prediction of the phase currents, the current will still flow anyway through the freewheeling diodes D1 to D6 arranged in parallel to the particular semiconductor switch S1 to S6.

Figure 5:
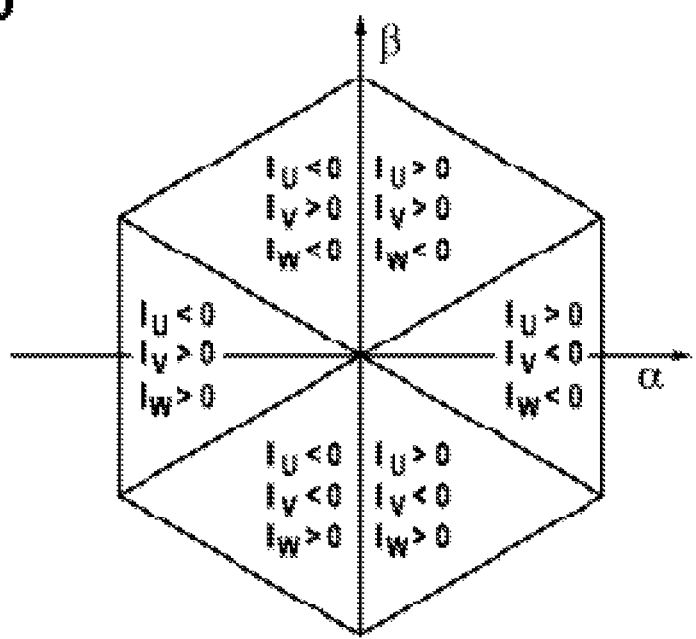
FIG. 5 shows a diagram for the determination of the sign of phase currents of the type which forms the basis for a three-phase pulse-controlled inverter according to one further embodiment.

Alternatively, an analysis of the sector in which the current phasor is situated can also take place. As represented in FIG. 5, for example, the signs of the three phase currents $I_U$, $I_V$ and $I_W$ are constant in sectors of 60° each. Exactly one sign changes from one sector to the next in this case. On the basis of the signs of the particular phase currents predicted in this manner, the control device 10 can determine whether the current through the particular freewheeling diode D1 to D6 will flow, or whether an active triggering of the corresponding semiconductor switch S1 to S6 is required.

In order to increase the robustness, it is also advantageous if additional safety ranges are defined, so that the control device 10 does not immediately suppress the triggering of a semiconductor switch S1 to S6 if it is determined on the basis of the determination of the sign in one phase current $I_U$, $I_V$, $I_W$ that the current would flow through the freewheeling diode D1-D6. Instead, an additional safety range is defined, which the current phasor must exceed before a suppression of the triggering signals by the control device 10 takes place. This allows interference effects such as current ripples, non-sinusoidal phase currents, or dynamic changes to be compensated for. As a trade-off, the number of suppressed switching operations is reduced as a result.

FIG. 6 shows a schematic representation of a flow chart on which a method 100 for operating a power converter comprising a semiconductor switch S1-S6 is based. As described above, the semiconductor switch S1-S6 includes not only the two current-carrying terminals, but also a control terminal. A diode is arranged in parallel to the two current-carrying terminals. In step 110, first, control signals for triggering the semiconductor switch S1 to S6 are generated. In step 120, a current within the pulse-controlled inverter is detected. For example, this current can be a current through one of the freewheeling diodes D1-D6 or a phase current occurring at the phase terminal U, V, W. Next, in step 130, the generated control signals at the control terminal of the semiconductor switch S1-S6 are modified in accordance with the current detected in step 120. In particular, in step 130, the control signals are provided at the control terminal of the semiconductor switch S1-S6 only when it is determined—in accordance with the current detected in step 120—that no current flows through the diode D1-D6. In particular, the control signals are provided at the control terminal only when the detected current reveals that the current through the diode D1-D6 falls below a predefined threshold value.

In order to determine the current flow through the diode D1-D6, a calculated prediction of the current of a connected load, for example, an electric drive 3, can also take place, in particular. In particular, current progressions which have already been measured can also be utilized for this purpose. The current progressions calculated in this way can also be utilized already in the generation of the control signals for the triggering of the semiconductor switches S1-S6, so that, in this case, a control signal for triggering a semiconductor switch S1-S6 does not even need to be generated or provided if it was determined that the current will flow through the freewheeling diode D1-D6 arranged in parallel to the semiconductor switch S1-S6.

For the prediction of the current progressions, a transformation of the phase currents into an α-ß coordinate system, for example, by means of Clarke transformation, in particular, can take place.

In summary, the present invention relates to a pulse-controlled inverter comprising one or multiple semiconductor switches and freewheeling diodes arranged in parallel to each semiconductor switch. The semiconductor switches are triggered only when the current does not flow through a freewheeling diode which is arranged in parallel to the semiconductor switch. This allows the number of triggering processes for the semiconductor switch to be reduced. The reduced number of triggering processes for the semiconductor switches results in lower power losses and an increased service life of the entire system.

The invention claimed is:

1. A pulse-controlled inverter (1) for providing a pulse-width modulated output voltage at a phase terminal (U, V, W), comprising:
    a semiconductor switch (S1-S6) which includes an input terminal, an output terminal, and a control terminal;
    a diode (D1-D6) which is arranged in parallel to the semiconductor switch (S1-S6), between the input terminal and the output terminal of the semiconductor switch (S1-S6), wherein the pulse-width modulated output voltage is provided at a node, at which the diode (D1-D6) and the input terminal or output terminal of the semiconductor switch (S1-S6) are connected to each other;
    a current detector (I1-I9) which is designed for detecting a current in the pulse-controlled inverter (1); and a control device (10) which is designed for generating control signals for triggering the semiconductor switch (S1-S6) and providing said signals at the control terminal of the semiconductor switch (S1-S6), wherein the control device (10) is further designed for suppressing a generated control signal that has previously been generated in accordance with the current at the control terminal of the semiconductor switch (S1-S6), which is detected by the current detector (I1-I9).

2. The pulse-controlled inverter (1) as claimed in claim 1, wherein the current detector (I1-I9) is designed for detecting a current through the diode (D1-D6), the semiconductor switch (S1-S6), or at the phase terminal (U, V, W).

3. The pulse-controlled inverter (1) as claimed in claim 1, wherein the control device (10) suppresses the generated control signal at the control terminal of the semiconductor switch (S1-S6) if a current in a predetermined direction through the current detector (I1-I3) has been detected.

4. The pulse-controlled inverter (1) as claimed in claim 1, wherein the control device (10) suppresses the generated control signal at the control terminal of the semiconductor switch (S1-S6) only if the absolute value of the current detected by the current detector (I1-I9) is greater than a predetermined threshold value.

5. The pulse-controlled inverter (1) as claimed in claim 1, wherein the control device (10) is further designed for calculating a current progression in the pulse-controlled inverter (1) and suppressing the generated control signals in accordance with the calculated current progression at the control terminal of the semiconductor switch (S1-S6).

6. The pulse-controlled inverter (1) as claimed in claim 1, wherein the semiconductor switch (S1-S6) includes a bipolar transistor having an insulated gate electrode, IGBT.

7. The pulse-controlled inverter (1) as claimed in claim 1, comprising a half-bridge (11, 12, 13) which includes a first semiconductor switch (S1, S3,S5), a first diode (D1, D3, D5), a second semiconductor switch (S2, S4, S6), and a second diode (D2, D4, D6), wherein the first semiconductor switch (S1, S3,S5) is arranged between the positive potential of a supply voltage and a node, the second semiconductor switch (S2, S4, S6) is arranged between the node and the negative potential of the supply voltage, the first diode (D1, D3, D5) is arranged between the positive potential of the supply voltage and the node, and the second diode (D2, D4, D6) is arranged between the node and the negative potential of the supply voltage, and wherein the phase terminal (U, V, W) is connected to the node.

8. A method (100) for operating a pulse-controlled inverter (1) that includes a semiconductor switch (S1-S6) having an input terminal, an output terminal, and a control terminal, and a diode (D1-D6) which is arranged in parallel to the semiconductor switch (S1-S6), between the input terminal and the output terminal of the semiconductor switch (S1-S6), wherein the pulse-controlled inverter provides a pulse-width modulated output voltage at a phase terminal, and wherein the method (100) comprises:
generating (110) control signals for triggering the semiconductor switch (S1-S6);
detecting (120) a current within the pulse-controlled inverter (1); and
suppressing (130) the generated control signals, which have previously been generated, at the control terminal of the semiconductor switch (S1-S6) in accordance with the detected current.

9. The method (100) as claimed in claim 8, wherein the step (130) for suppressing the generated control signal at the control terminal of the semiconductor switch (S1-S6) suppresses the control signal if a current in a predetermined direction was detected in the step (120) of detecting a current within the pulse-controlled inverter (1).

10. The method (100) as claimed in claim 8, wherein the step (130) of suppressing the generated control signal at the control terminal of the semiconductor switch (S1-S6) suppresses the control signal if the absolute value of the detected current is greater than a predetermined threshold value.

11. The method (100) as claimed in claim 8, including a step of calculating a current which occurs at the pulse-controlled inverter (1), wherein the step of calculating the resultant current takes place on the basis of the detected current, and wherein the step (130) of suppressing the generated control signal at the control terminal of the semiconductor switch (S1-S6) suppresses the control signal on the basis of the calculated current.

12. The method (100) as claimed in claim 11, wherein the step (130) of calculating the resultant current calculates the current on the basis of a Clarke transformation.

* * * * *